(12) United States Patent
Mellen

(10) Patent No.: US 9,970,732 B2
(45) Date of Patent: May 15, 2018

(54) COMPACT AND ERGONOMIC BALL-LAUNCHING DOG TOY

(71) Applicant: Gramercy Products, Inc., Secaucus, NJ (US)

(72) Inventor: Chris Mellen, Yonkers, NY (US)

(73) Assignee: Gramercy Products, Inc., Secaucus, NJ (US)

( * ) Notice: Subject to any disclaimer, the term of this patent is extended or adjusted under 35 U.S.C. 154(b) by 0 days. days.

(21) Appl. No.: 15/444,750

(22) Filed: Feb. 28, 2017

(65) Prior Publication Data

US 2017/0284764 A1    Oct. 5, 2017

Related U.S. Application Data

(60) Provisional application No. 62/314,542, filed on Mar. 29, 2016.

(51) Int. Cl.
| | |
|---|---|
| *F41B 7/08* | (2006.01) |
| *A01K 15/02* | (2006.01) |
| *F41B 3/00* | (2006.01) |

(52) U.S. Cl.
CPC .............. *F41B 7/08* (2013.01); *A01K 15/025* (2013.01); *F41B 3/005* (2013.01)

(58) Field of Classification Search
CPC .......... F41B 3/005; F41B 7/08; A01K 15/025; A63B 65/122
USPC ................................. 124/16, 17, 21, 27, 37
See application file for complete search history.

(56) References Cited

U.S. PATENT DOCUMENTS

| 583,175 | A | * | 5/1897 | Harold | ..................... F41B 3/005 |
|---|---|---|---|---|---|
| | | | | | 124/21 |
| 2,287,636 | A | * | 6/1942 | Hayter | ..................... F41B 3/005 |
| | | | | | 124/21 |
| 2,318,139 | A | * | 5/1943 | Calabrese | ................. F41B 3/03 |
| | | | | | 124/35.1 |
| 2,650,593 | A | | 9/1953 | Weil | |
| 3,717,136 | A | | 2/1973 | Gay | |
| 4,014,307 | A | * | 3/1977 | Horvath | ............... A63B 69/409 |
| | | | | | 124/81 |
| 4,241,716 | A | | 12/1980 | Tsui | |
| 4,367,723 | A | | 1/1983 | Resuggan | |
| 4,709,685 | A | * | 12/1987 | Kholin | ................... A63B 69/40 |
| | | | | | 124/39 |

(Continued)

*Primary Examiner* — Alexander Niconovich

(74) *Attorney, Agent, or Firm* — Thomas A. O'Rourke; Bodner & O'Rourke, LLP

(57) ABSTRACT

A ball-launching device includes a housing, ball holder, elastomeric member, cocking member, latch, and trigger assembly. The housing has an opening at a first end defining an elongated cavity. The ball holder is disposed in the housing cavity and slidable in an axial direction from a first position proximate to the opening at the housing first end, to a second position. The elastomeric member is selectively arranged within the housing to bias the ball holder toward the first position. The cocking member includes a first portion disposed outside of the housing, being usable to move the ball holder into a cocked position, where the latch may oppose the bias of the elastomeric member and releasably secure the cocking member and the ball holder thereat. Actuating the trigger assembly releases the latch, permitting the elastomeric member to accelerate the ball holder towards the housing first end to launch the ball therefrom.

17 Claims, 15 Drawing Sheets

(56) References Cited

U.S. PATENT DOCUMENTS

| | | | |
|---|---|---|---|
| 4,870,945 A | 10/1989 | Hutchison | |
| 5,243,955 A * | 9/1993 | Farless | F41B 3/005 124/20.1 |
| 5,253,873 A * | 10/1993 | Grattan | F41B 7/00 124/16 |
| 5,579,749 A * | 12/1996 | Wilkinson | F41B 3/005 124/16 |
| 5,611,321 A * | 3/1997 | Hoeting | F41B 4/00 124/6 |
| 5,791,326 A | 8/1998 | Brown | |
| 5,979,424 A * | 11/1999 | Alvarez | F41B 7/08 124/16 |
| 5,988,152 A * | 11/1999 | Halter | F41B 11/54 124/31 |
| 6,119,671 A | 9/2000 | Smith | |
| 6,523,535 B2 * | 2/2003 | Rehkemper | F41B 4/00 124/78 |
| 7,448,371 B2 * | 11/2008 | Sapir | F41B 3/005 124/16 |
| 7,905,222 B1 * | 3/2011 | Fenley | A63B 69/407 124/16 |
| 7,938,110 B2 | 5/2011 | Udwin | |
| 8,245,702 B2 * | 8/2012 | Lendvay | A01K 15/025 124/16 |
| 8,393,299 B1 * | 3/2013 | Bernat | F41B 7/003 119/702 |
| 9,303,942 B2 * | 4/2016 | Sievers | A63H 33/18 |
| 9,352,244 B2 * | 5/2016 | Aguila | A63H 37/00 |
| 9,719,749 B1 * | 8/2017 | Prior | F41B 5/0094 |

* cited by examiner

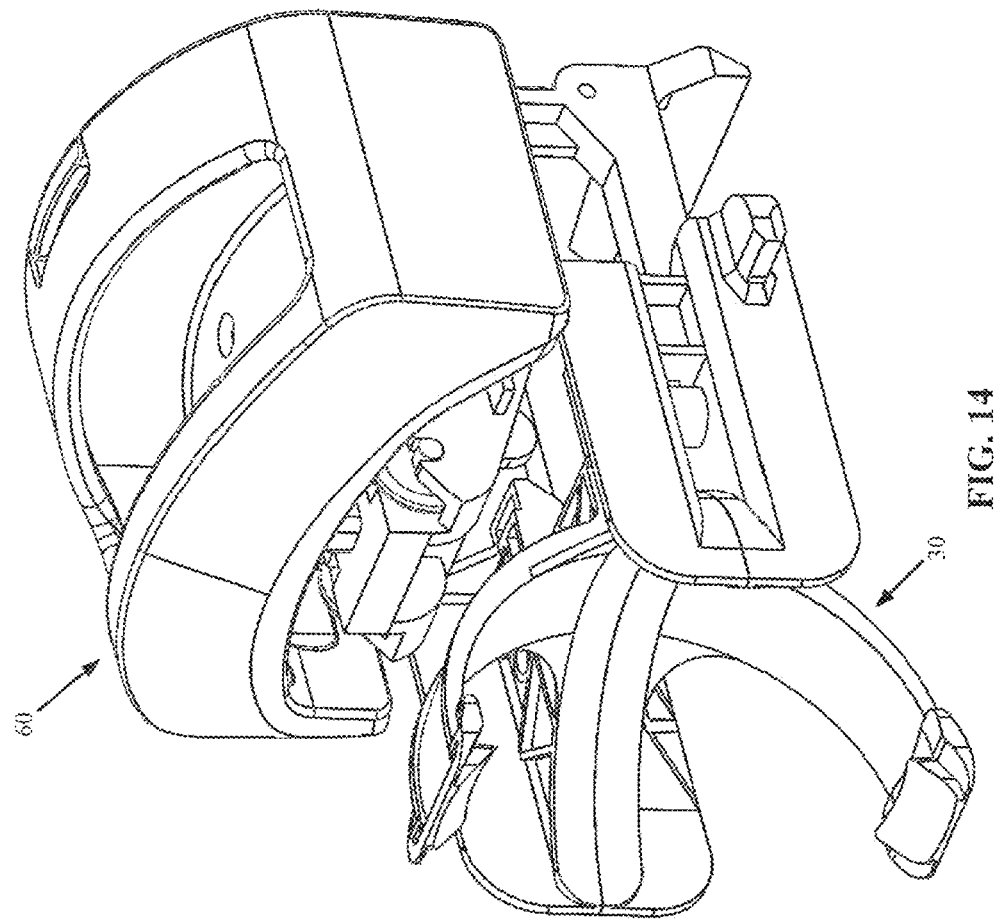

COMPACT AND ERGONOMIC BALL-LAUNCHING DOG TOY

CROSS REFERENCES TO RELATED APPLICATIONS

This application claims priority on U.S. Provisional Application Ser. No. 62/314,542 filed on Mar. 29, 2016, the disclosures of which are incorporated herein by reference.

FIELD OF THE INVENTION

The present invention relates to pet toys, and more particularly to a ball launcher that may be used to play fetch with a dog.

BACKGROUND OF THE INVENTION

The game of fetch is typically played with a dog, although some cats have been known to enjoy playing the game as well. The game is fun for both the pet and the pet owner, and also provides exercise for the animal at the same time. To play the game, an object (e.g., a stick, a ball, or a Frisbee) is grasped by the pet owner and is thrown or flung some distance away, while the dog is watching such actions. Ordinarily, the pet owner will also yell "fetch" as a keyword to indicate the game is being played, and that the dog is to retrieve the object. Many dogs play the game instinctively, while others need some help in learning to not only chase after the object, but to bring it back as well.

Most dogs enjoy playing the game almost endlessly, which can also be tiring for the owner. Flinging the object greater and greater distances so that the dog needs to work harder and run farther may also wear out the pet owner. Using a ball to play the game offers some advantages, such as its ability to bounce and roll to cover even greater distances, as well as its shape naturally tending to sit up off the ground for the dog to more easily grasp it with its jaws. Using a ball to play the game also allows it to be launched greater distances using a ball launcher pet toy device.

An example of such a prior art ball launching pet toy is shown by U.S. Pat. No. 8,245,702 to Lendvay for a "Dog Ball Shooting Device." The device of the '702 patent includes an outer tube, and an inner tube that slidably retracts into the inner tube, against the bias provided by a spring, and may be releasably held therein by a ratchet mechanism and gripping mechanism, until the trigger is actuated to launch the ball. The Lendvay device is "shaped and sized like a walking cane" and requires that the user push down on the handle to cock the device.

The present invention offers advantages over prior art ball launching devices.

OBJECTS OF THE INVENTION

It is an object of the invention to provide a mechanical device that may be used to launch a ball.

It is another object of the invention to provide a device that may be used by a dog owner to play the game of fetch using a ball.

It is a further object of the invention to provide a mechanical ball launching device that is compact and easily operated by a small boy or girl to launch a ball at least 50 feet.

It is another object of the invention to provide a ball launching device that is capable of reloading the ball into the launching chamber without the pet owner having to pick up the ball using his/her hands.

It is also an object of the invention to provide a ball launching device that may launch a ball to any one of several different distances, to be in accordance with a current launch distance desired by the pet owner.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the present invention, a compact ball-launching dog toy may broadly include a housing, a ball holder, an elastomeric member, and a cockling member. The housing may be elongated, having a first end and a second end, and may have an opening at the first end defining an elongated interior surface of a cavity. The housing may also have another opening that may be interconnected with the cavity, and which opening may be elongated. The ball holder may be disposed in the housing cavity and may be configured to slide in an axial direction of the housing from a first position proximate to the opening at the housing first end, to a second position being between the first position and the housing second end. The elastomeric member may be a rod shape with a length selectively arranged within the housing to bias the ball holder from the second position towards the first position. The cocking member may be coupled to the ball holder, and may include: a first portion disposed outside of the housing; a second portion disposed within the housing cavity; and a neck portion between the first, and second portions, with the neck portion configured to be slidable within the elongated housing opening. With this embodiment, the first portion of the cocking member may actuated by a user to oppose the bias of the elastomeric member, by pulling the cocking member toward the user's body into, a cocked position, while the second end of the housing may be conveniently positioned against the user's body, for the ball holder to be moved from the first position at least part-way towards the second position.

In another embodiment, the compact ball-launching dog toy may additionally include a latch configured to releasably secure the cocking member and the ball holder at the cocked position, to releasably hold the elastomeric member in an extended position, to oppose the bias thereof. The latch could be manually released by the user to permit the elastomeric member to accelerate the ball holder towards the housing first end to launch the ball therefrom.

In yet another embodiment of the compact ball-launching dog toy, the cocking member may be releasably coupled to the ball holder, and the device may additionally include a trigger assembly movably mounted to the housing. The trigger assembly may be configured, when actuated, to trigger the latch, to release the ball holder and permit the elastomeric member to accelerate the ball holder towards the housing first end to launch the ball therefrom.

Alternatively, a first pulley and a second pulley may be rotatably mounted to a first side and a second side of the housing cavity, respectively, in proximity to the housing first end. The elastomeric member may have a first end and a second end, each respectively secured to the first side and the second side of the housing cavity, in proximity to the housing second end, with the elastomeric member wound over the first pulley, around a portion of the ball holder, and over the second pulley, to provide the described bias.

The latch may include a pawl, a plurality of teeth formed on the housing, a hook member, and a spring. The plurality of ratchet teeth may protrude from the interior surface of the housing cavity, the ratchet teeth may be successively positioned between the first end and the second end of the housing, and may be in proximity to the elongated opening that is interconnected with the cavity. The pawl may be pivotally mounted to the cocking member, with a first portion of the pawl configured to engage one of the plurality of ratchet teeth at the cocked position. The hook member may have a first end and a second end, the first end of the hook member may include a hook portion. The hook member may be pivotally mounted, distally from the first end, to the second portion of the cocking member. The spring may be configured to bias the hook portion of the hook member to pivot towards the second cocking member portion. A recess in the ball holder may be configured to receive the hook portion of the hook member therein, which may automatically engage the recess of the ball holder, when the cocking member is moved into proximity with the ball holder at its first position, to be releasably coupled thereto. A spring may be used, to bias the pawl into engagement with the one of the plurality of ratchet teeth, to releasably retain the coupled cocking member and ball, holder at the cocked position. Therefore, when the trigger assembly is actuated, it may cause disengagement of the hook portion of the hook member from the recess in the ball holder, for the elastomeric member to accelerate the ball holder toward the housing first end.

The pivotally mounted pawl may have a second portion disposed outside of the housing, being actuable to pivot the pawl to become disengaged from the one of the plurality of ratchet teeth, for the cocking member to freely move with respect to the elongated housing opening. This may permit the cocking member to be moved to a different cocked position to engage a different tooth thereat (with the elastomeric member to storing greater or lesser strain energy), or to be moved so the ball holder may be returned to its first position, without launching the ball. The first portion of the cocking member may include a finger graspable recess on a top thereof, being configured to receive at least four fingers of a user to be usable to extend the elastomeric member, and the second portion of the pawl may be disposed in proximity to the finger graspable recess of the first portion of the cocking member to readily accommodate such adjustments.

The housing may include a handle portion extending away from a bottom of the housing, proximate to the second end. The trigger assembly may include a trigger member and a release member. The trigger member may be slidably mounted with respect to the handle portion of the housing. The release member may include a transverse member and a pair of elongated arms configured to extend from the transverse member in the axial direction of the housing, at a bottom of the housing cavity. A top of each of the pair of arms include a plurality of teeth, and side of each of the pair of arms may include a pair of shaped openings. The housing may house a pair of pins protruding inwardly into the cavity from a first side and a second side of the cavity. Thus, the pair of shaped opening on each of the pair of arms may be configured to respectively track on the pins on the first and second sides of the housing to cause the arms to first elevate, for one of the teeth to engage with the hook member, and to subsequently translated axially to drive the hook member to cause the disengagement of the hook portion from the recess of the ball holder. Thereafter, the elastomeric member may accelerate the uncoupled ball holder toward the housing first end.

BRIEF DESCRIPTION OF THE DRAWINGS

The description of the various example embodiments is explained in conjunction with appended drawings, in which:

FIG. 14 is a perspective view showing the carriage and slide handle of FIG. 13, with the carriage releasably engaged with the ball holder.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include," "including," and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" means all of the following possible combinations: A alone; or B alone; or C alone; or A and B together; or A and C together; or B and C together; or A, B and C together.

Also, all references (e.g., patents, patent publications, and non-patent literature) that are cited within this documents are incorporated herein in their entirety by reference.

Furthermore, the described features, advantages, and characteristics of any particular embodiment disclosed in the following specification, may be combined in any suitable manner with any of the other embodiments disclosed herein.

It is further noted that any use herein of relative terms such as "top," "bottom," "upper," "lower," "vertical," and "horizontal" are merely intended to be descriptive for the reader, based on the depiction of those features within the figures for one particular position of the device, and such terms are not intended to limit the orientation with which the device of the present invention may be utilized.

Figure 1:
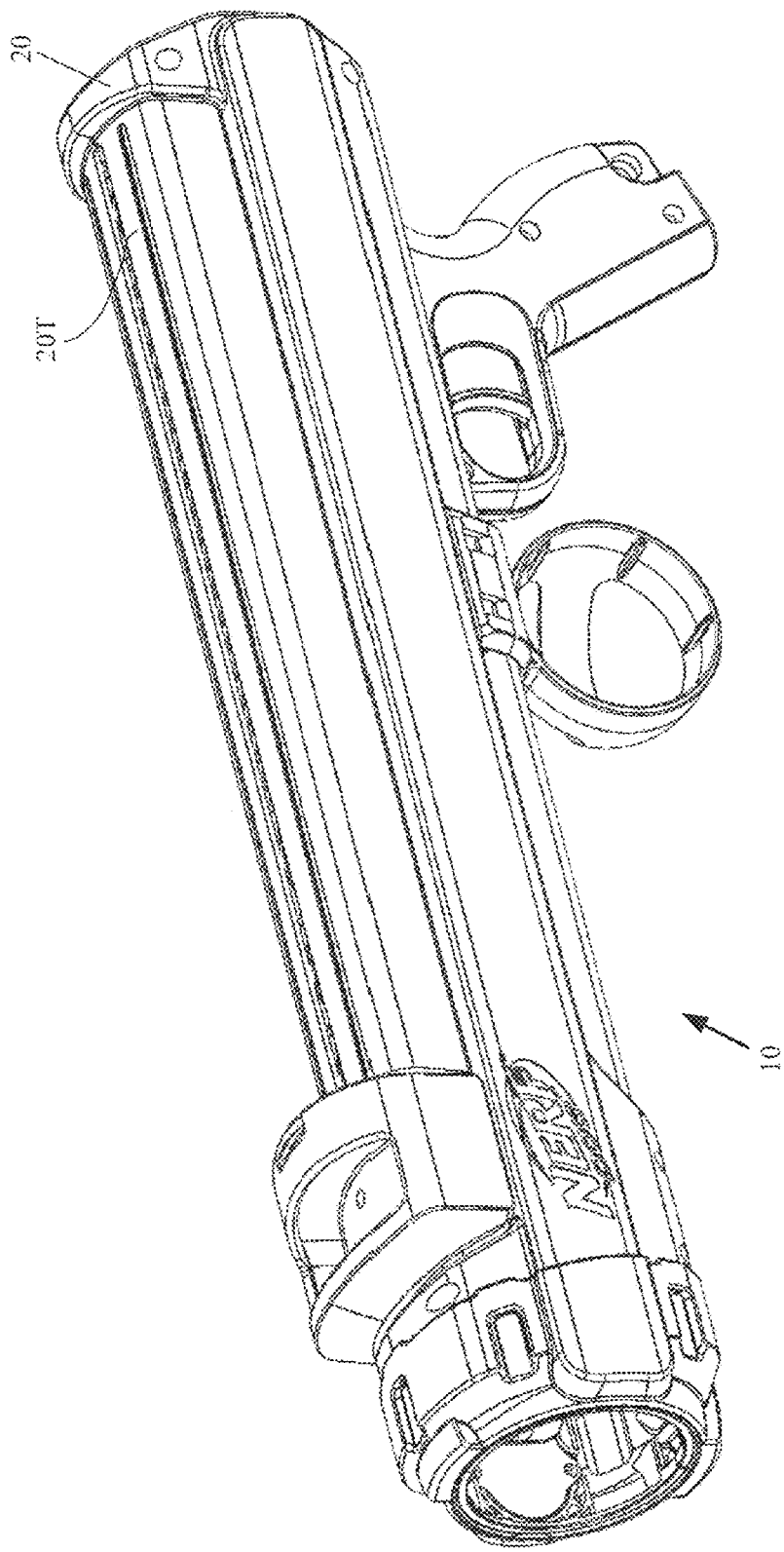
FIG. 1 is a perspective view of the ball launching dog toy of the present invention.

FIG. 1 illustrates a perspective view of the ball-launching dog toy 10 of the present invention. The ball launching device 10 may broadly include a housing, a ball holder, an elastomeric member, a cocking member, a latch, and a trigger.

Figure 2:
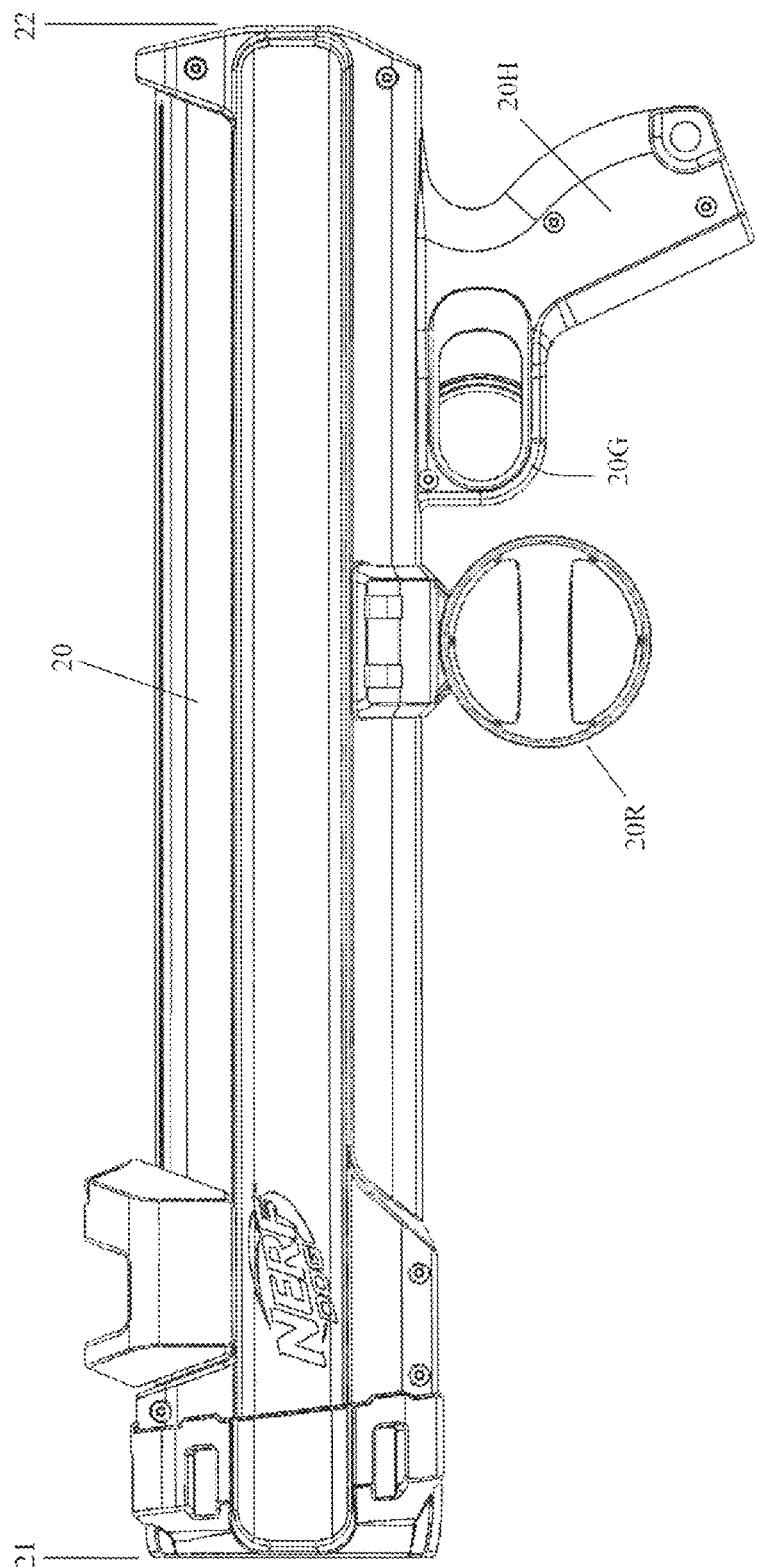
FIG. 2 is a side view of the ball launching dog toy of FIG. 1.
Figure 3:
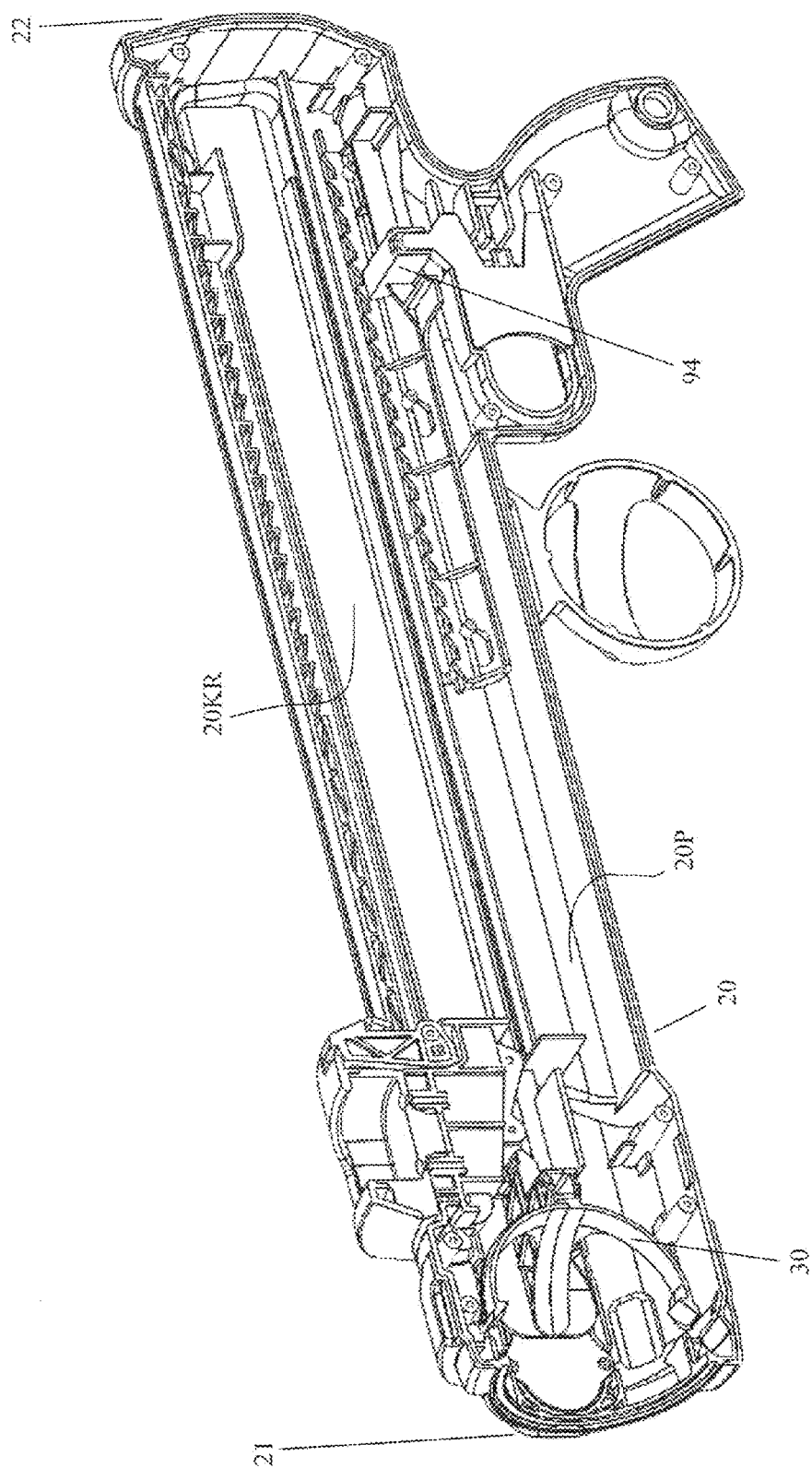
FIG. 3 is a cross-sectional perspective view through the mid-plane of the ball launching dog toy of FIG. 1.
Figure 8:
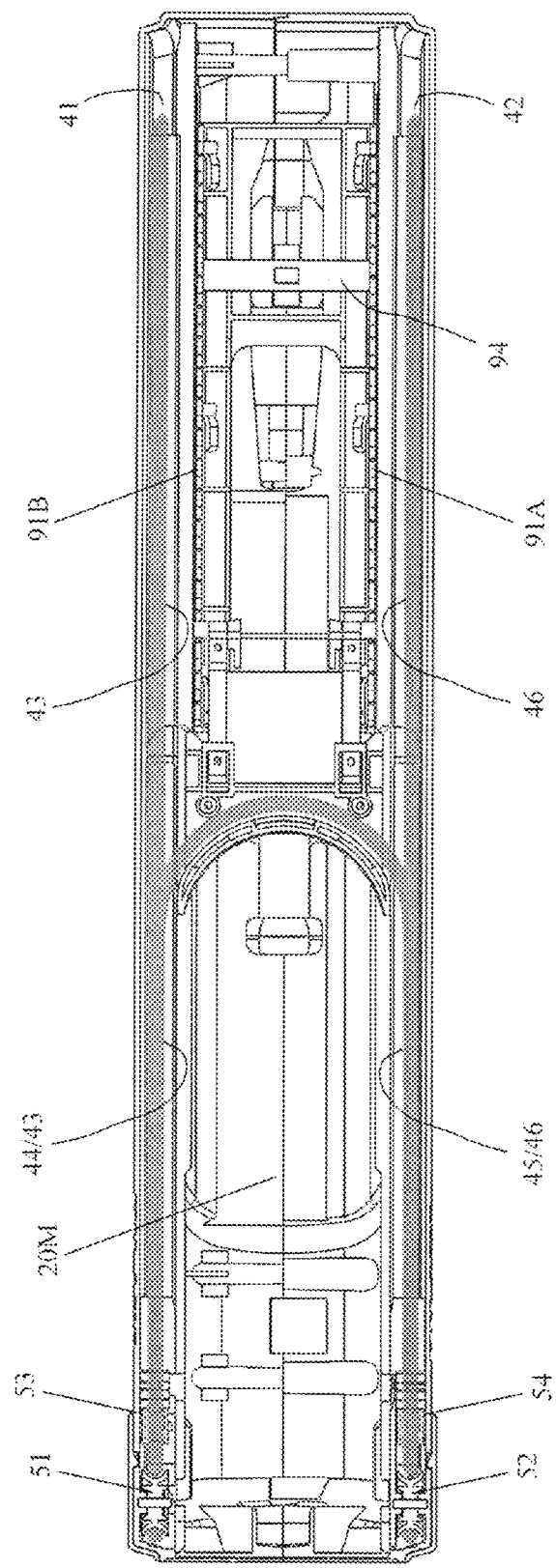
FIG. 8 is a cross-sectional top view through the bad launching dog toy of FIG. 2.

The housing 20 may be formed as a single elongated piece, or may be advantageously formed in two halves, and may be split roughly at the mid-plane 20M shown in FIG. 8. As shown in FIG. 3, the first (muzzle) end 21 of housing 20 may be formed with an opening 20P defining an elongated interior surface 20S of a cavity, while the second end 22 may form the butt end of the launcher 10. An elongated opening 20T may also be formed in the housing 20 to interconnect with the interior cavity. The opening 20T (see FIG. 1) may be formed at the top of the housing 20, at the mid-plane 20M, and may extend at least part-way between the first end 21 and second end 22. A lower portion of the housing 20 may be formed with a handle that may include a hand grip portion 20H and a trigger guard 20G (FIG. 2). The housing 20 may also include an outwardly protruding ring 20R configured, to receive and store a ball therein—a ball that may be used by the launcher 10. The ball used by the launcher 10 may be any suitable ball, and may be an ordinary tennis ball, or it may be a ball specially constructed to be used as a pet toy, and may be more durable in its construction, which may include a squeaker mounted therein.

Figure 4:
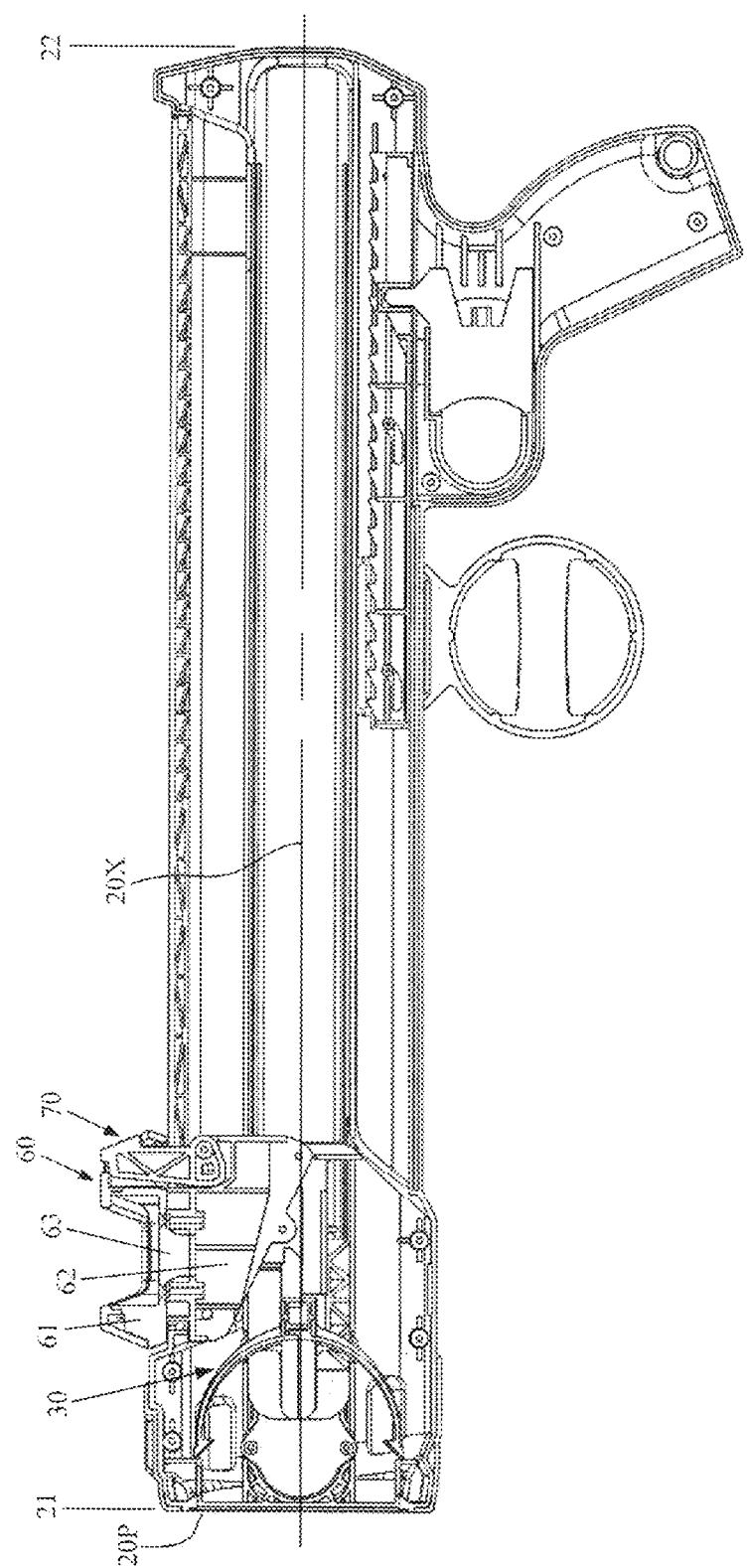
FIG. 4 is a cross-sectional side view through the mid-plane of the ball launching dog toy of FIG. 2, shown with the elastomeric member removed.
Figure 5:
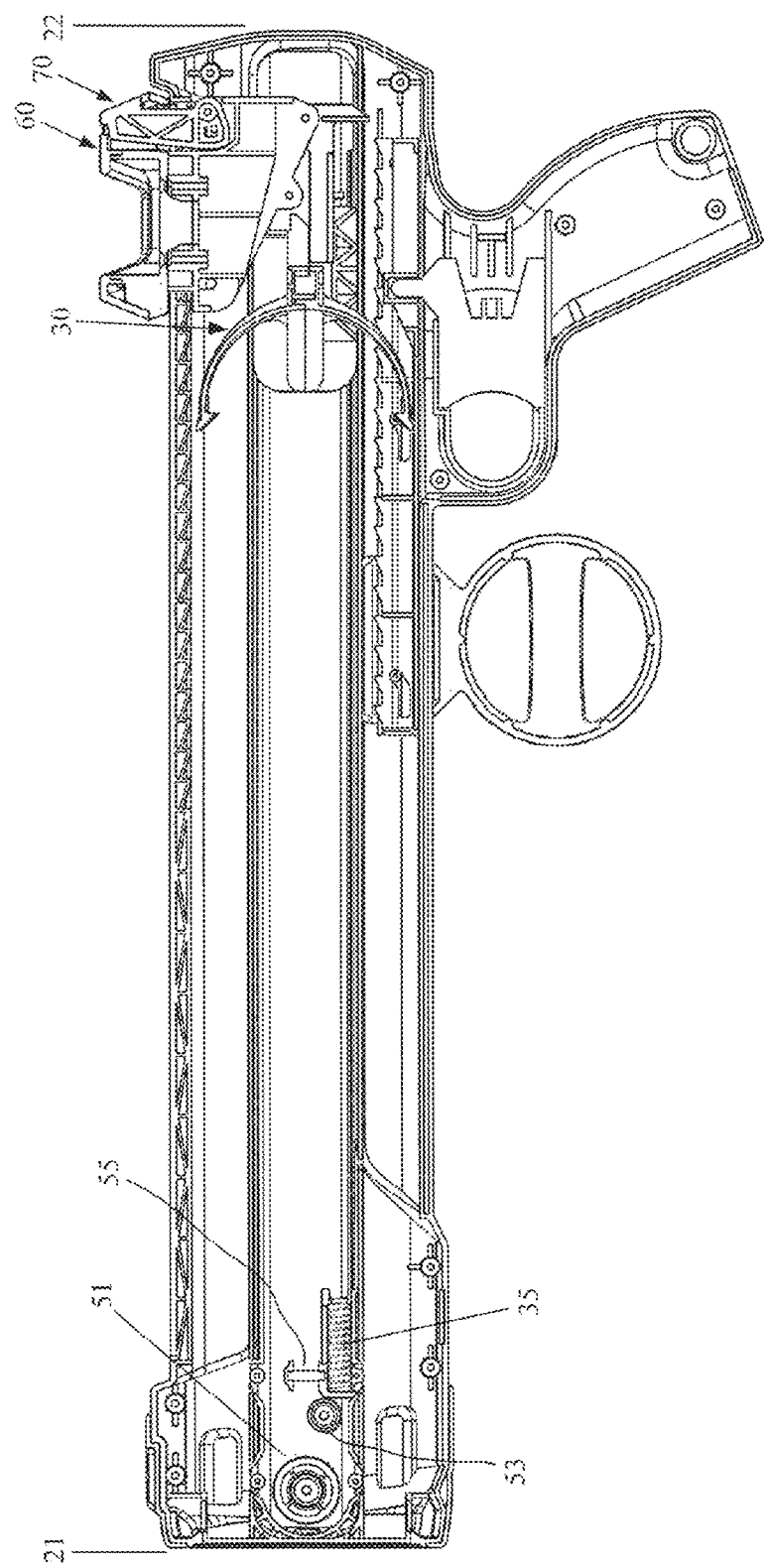
FIG. 5 is the cross-sectional view of FIG. 4, but shown with the pulley cover also removed, and shown with the ball holder having been moved from the ball launch position of FIG. 4 into a distal cocked position.
Figure 12:
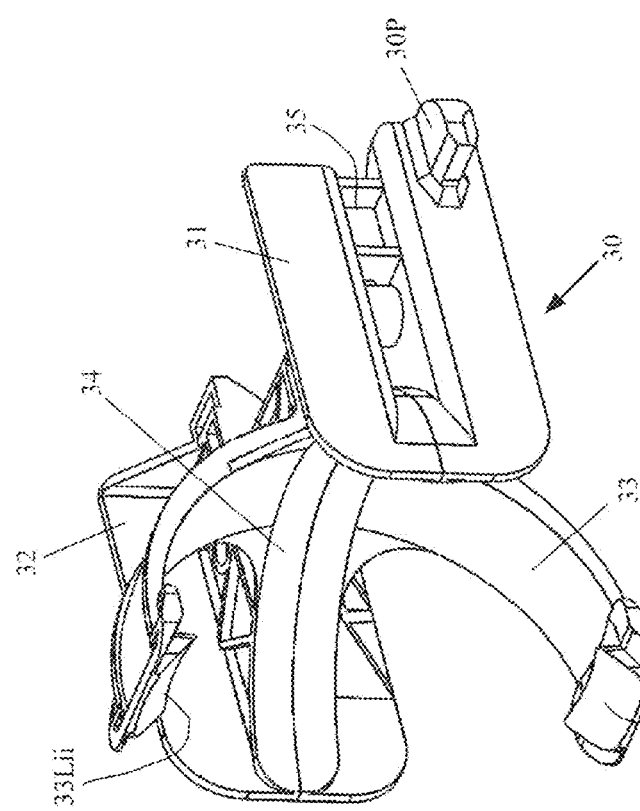
FIG. 12 is a detail perspective view of the ball holder.

As seen in FIGS. 3-4, the housing 20 of the ball launching device 10 may be configured to receive a ball holder 30 in a slidable relation within the housing cavity. The ball holder 30 may be slidable in the axial direction 20X from a first position proximate to the opening 20P at the housing first end 21 (FIG. 3), to a second position being proximate to the housing second end 22 (FIG. 4), and these positional limitations may be related to the positioning and length of the elongated opening 20T, as described hereinafter. The ball holder 30 is shown in detail in the perspective view of FIG. 12, and may be formed to create a generally spherical shape-configured to receive a portion of the ball therein. The generally spherical shape may be formed by a first member 33 and a second member 34, each of which may be generally arcuate, and each of which may also be formed as a spherical sector. At least one of the first member 33 and the second member 34 may have an inward protruding lip (e.g., lip 33Li). Alternatively, the first member 33 and the second member 34 may respectively be formed with inward protruding lip 33Li and inward protruding lip 33Lii, which, may be at its distal ends. The first and second inward protruding lips may be configured to releasably engage the ball in a slight friction fit. The extent of the friction fit may be at least such that the ball launcher 10 may be aimed down toward the ball as it rests on the ground, and by pressing the ball holder 30 against the ball the ball may be engaged by the lips just sufficiently to retain the ball therein, without it felling out when being lifted off the ground. This permits the pet owner to utilize the ball launcher 10 to reload the ball into the device, without having to grasp the ball using his/her hand, which may be advantageous after the pet has carried the ball in its mouth multiple times, so that the ball had thereby become moistened and possibly soiled from repeated contact with the ground.

Figure 7:
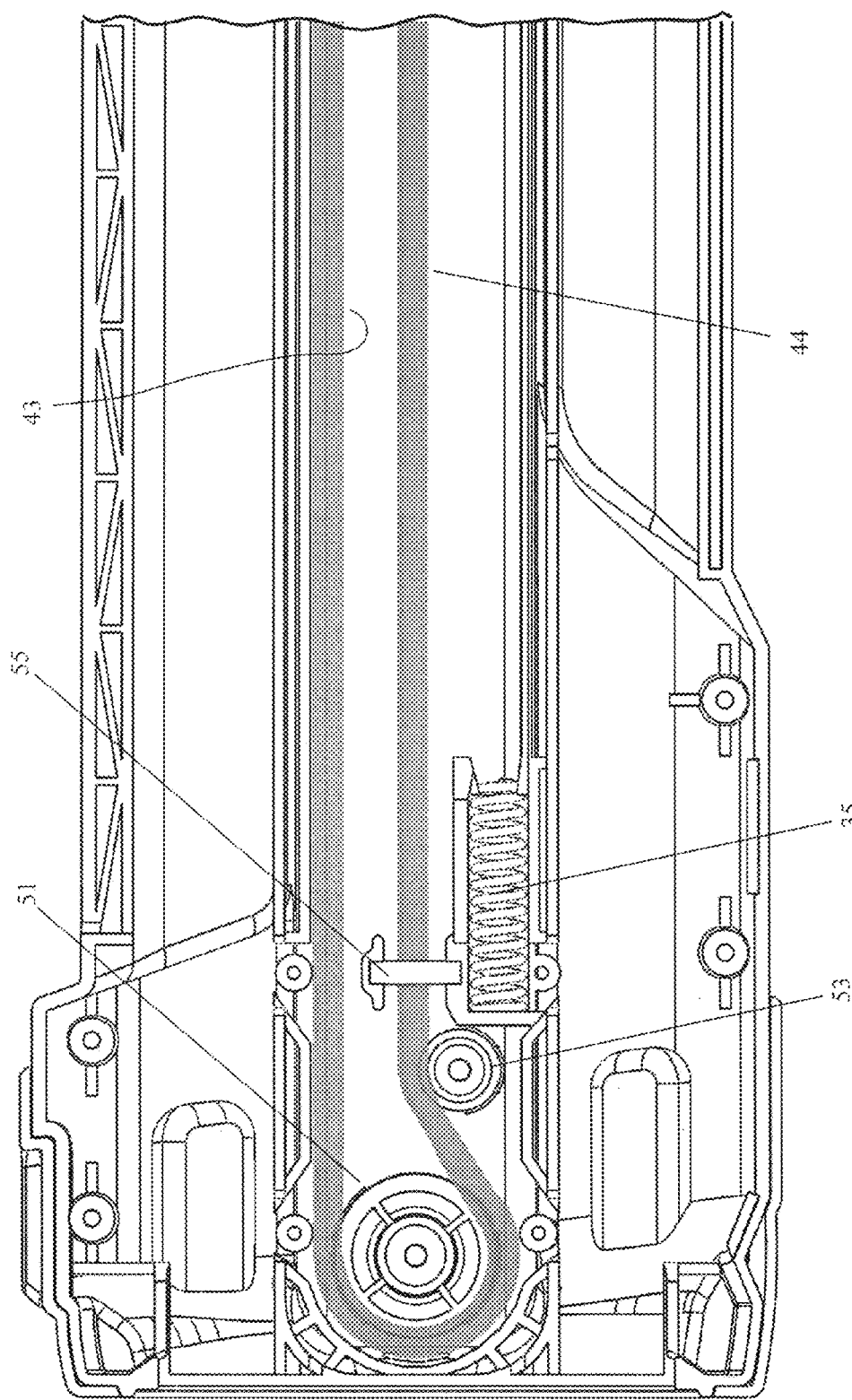
FIG. 7 is an enlarged detail view showing the muzzle end of the ball launching dog toy illustrated in FIG. 6.
Figure 9:
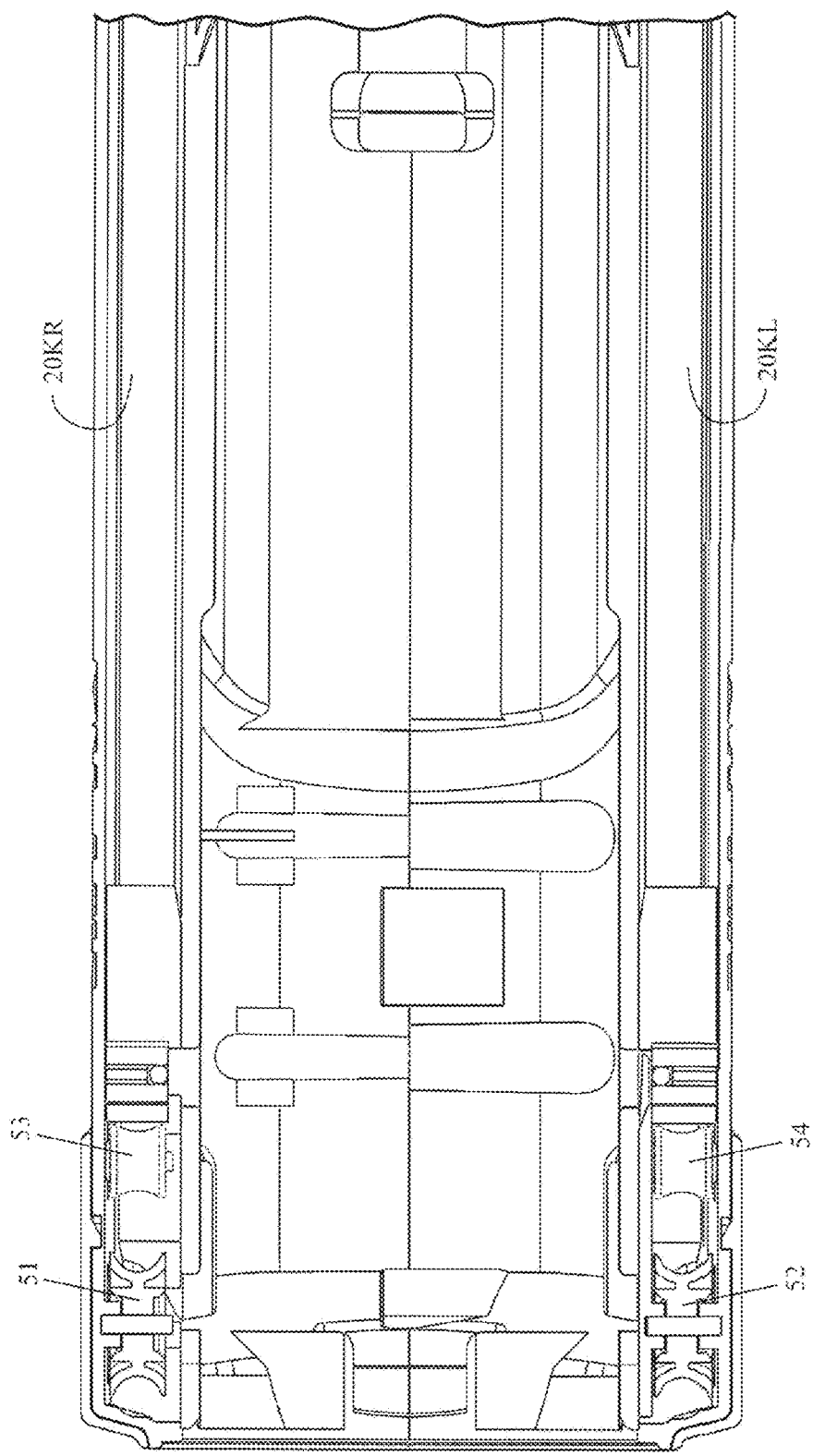
FIG. 9 is an enlarged detail view showing the muzzle end of the ball launching dog toy illustrated in FIG. 8, being shown with the elastomeric member removed.
Figure 10:
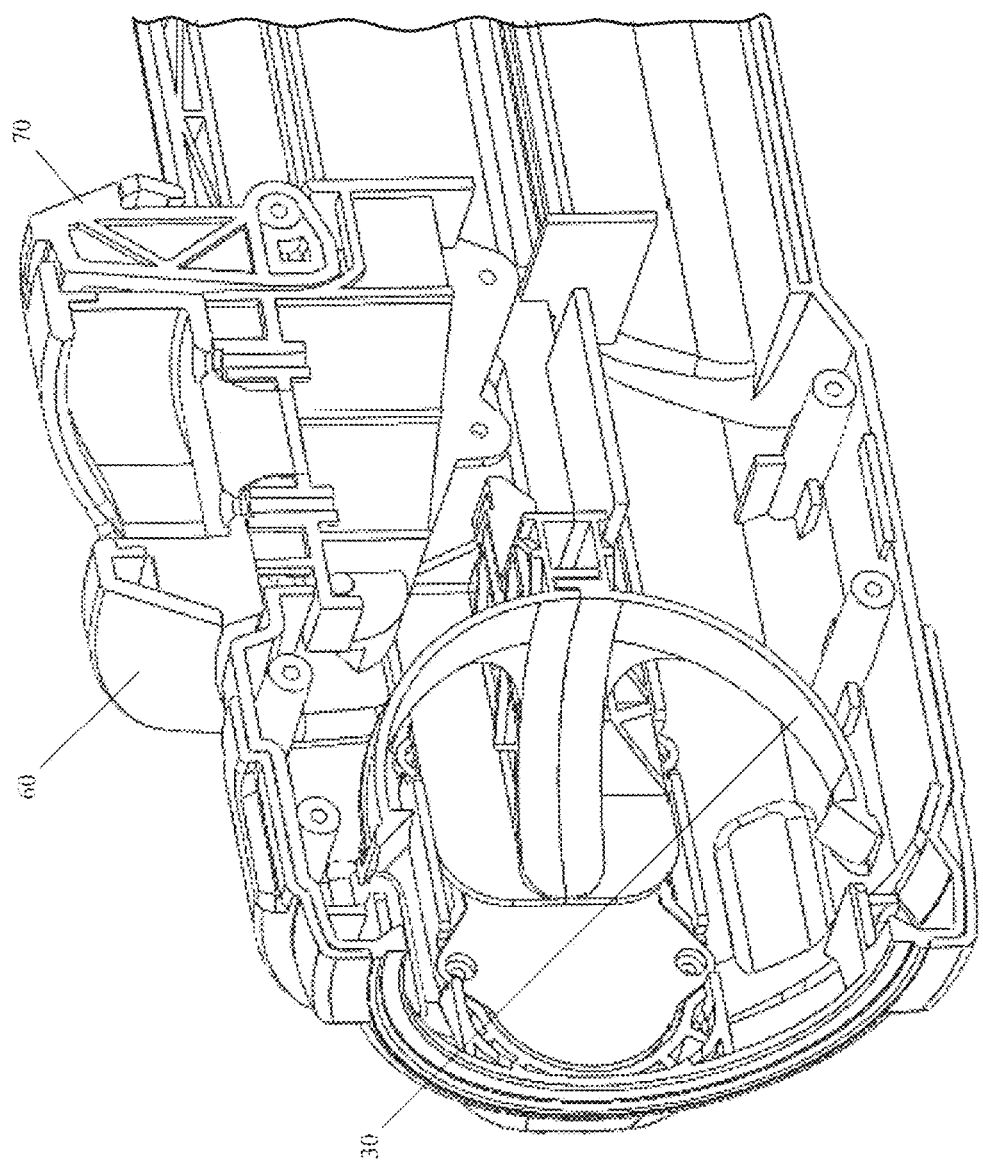
FIG. 10 is an enlarged detail, view showing the muzzle end of the ball launching dog toy illustrated in FIG. 3.
Figure 11:
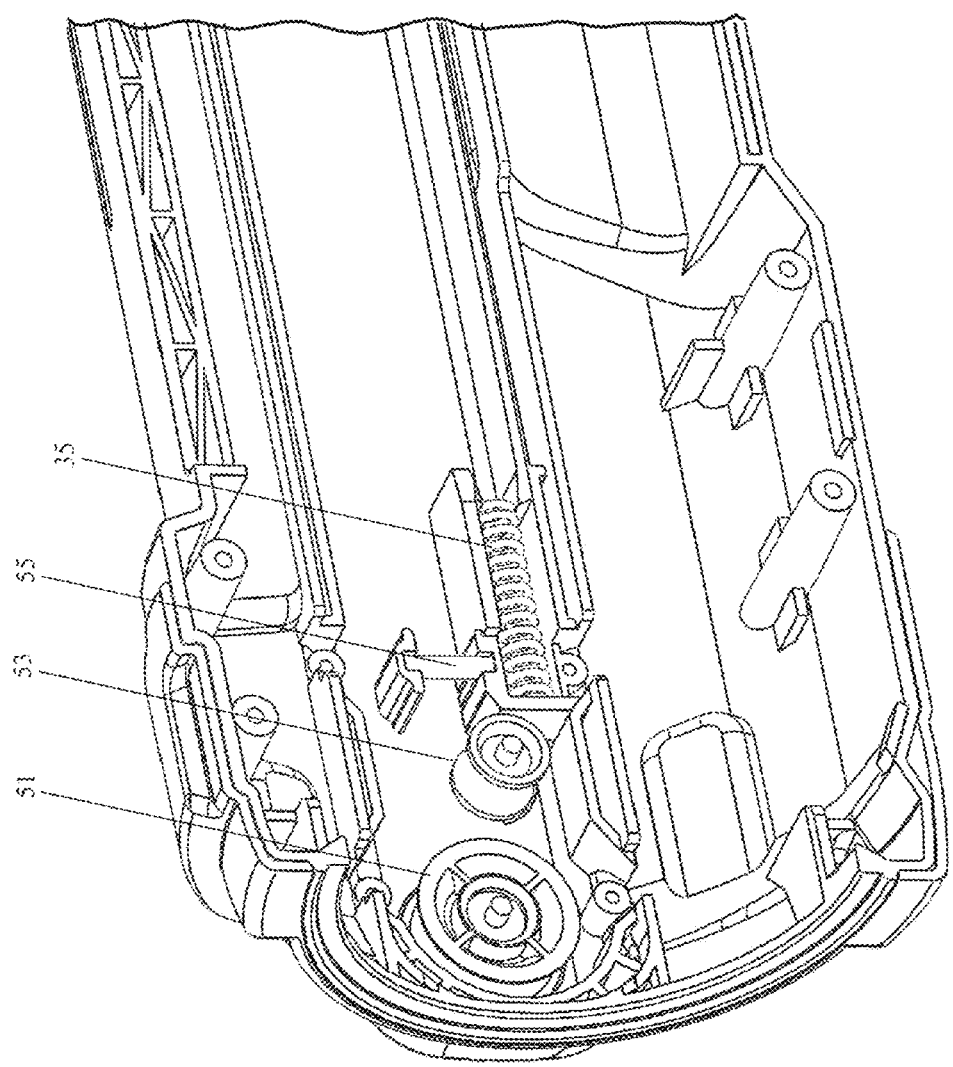
FIG. 11 is the enlarged detail view of FIG. 10, shown with the pulley cover and elastomeric member removed, and shown with the ball clamp, carriage, and slide, handle removed.

The ball holder 30 may have a first side flange 31 and a second side flange 32 (FIG. 12), which flanges may be configured to respectively slide in track 20KL and track 20KR on the left and right sides of the housing 20 within its cavity (see FIG. 9). Each of the flanges 31 and 32 may have a protrusion 30F protruding laterally therefrom. The protrusions 30F may be used to contact corresponding compression springs 35 on each of the left and right sides of the housing (see e.g., FIG. 7), as the ball holder reaches the housing first end 21, to quickly decelerate the ball holder and prevent localized shock loading of the housing, while the ball is ejected therefrom.

The ball holder 30 may be biased toward its first position using any suitable apparatus. However, an elastomeric member may be more effectively used in order that the housing 20 be formed to be very compact and the component parts of the device be economically arranged, as the elastomeric member may desirably be configured to accelerate the ball holder 30 to launch the ball a distance of at least 50 feet, while occupying a relatively small volume within the housing cavity. In a simple embodiment, the elastomeric member may have a rod shape (i.e., a circular cross-section), and each of its ends may be secured proximate to the first end 21 of the housing 20, and a central portion of the elastomeric member may be secured to (or may just wrap around) a portion of the ball holder 30 (e.g., the elastomeric member may pass through an opening in one or both of the flanges, such as opening 35 in flange 31). Therefore, as the ball holder 30 is moved away front the first position towards its second position, the elastomeric member would become increasingly elongated and store increasing amounts of strain energy that may be used to accelerate the ball holder, when released, to launch the ball out the housing first end 21. This arrangement may resemble the action provided by a sling shot, but may be limited in its ability to store sufficient strain energy to launch the ball as far as desired, without having the elastomeric member utilized be so stiff as to prevent a young person or an elderly person from being able to cock the device.

Figure 6:
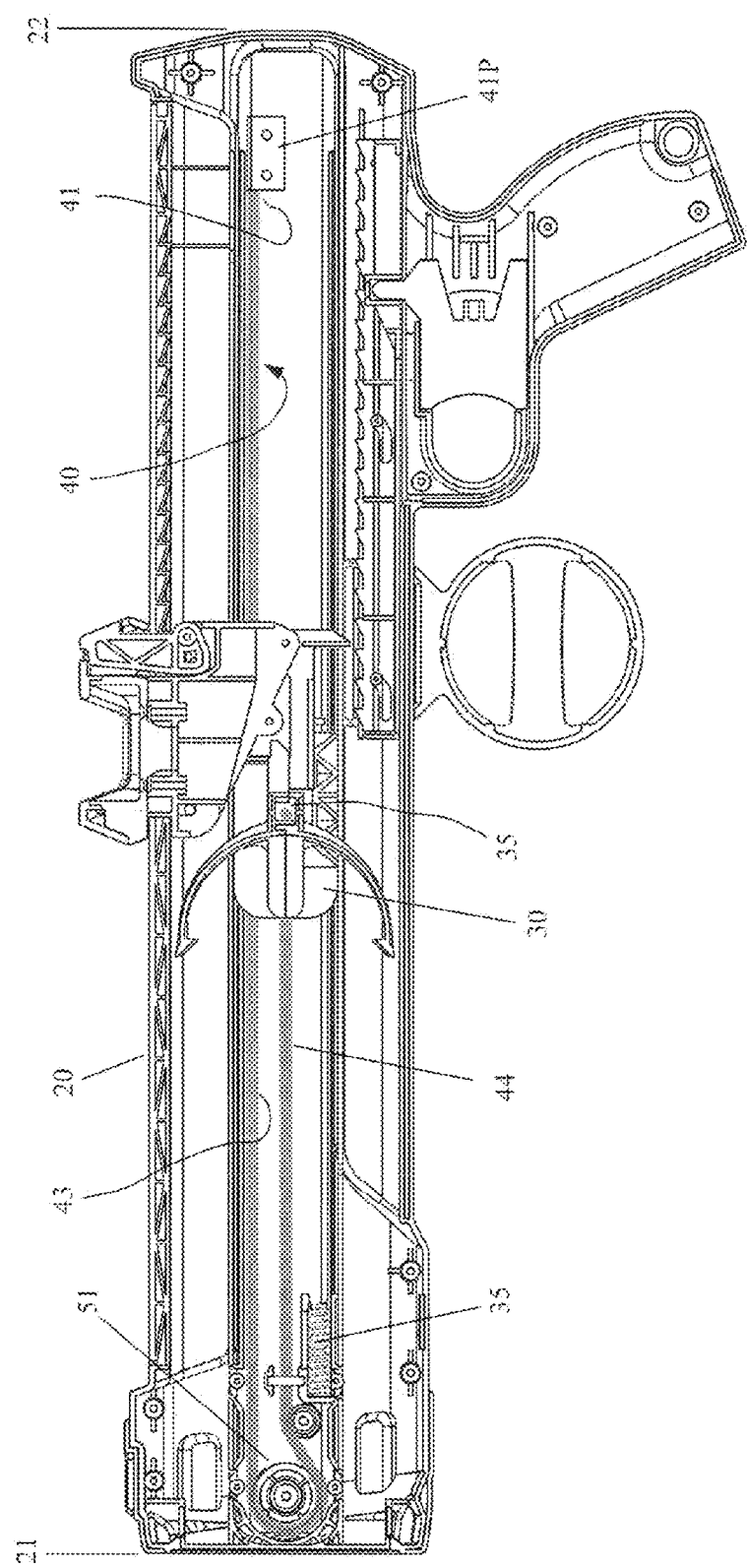
FIG. 6 is the cross-sectional view of FIG. 5, but shown with the ball holder having been moved into a central cocked position, and also showing the elastomeric member.

To provide for greater stored strain energy, using the same diameter and material type, a longer elastomeric member 40 may be used. The longer elastomeric member 40 may take on any suitable shape, and may be made of any suitable material type. However, in one embodiment, the elastomeric member 40 may be a natural latex rubber rod having a diameter of ¼ inch, and a tensile strength of 2500 psi, which in combination with lengths disclosed herein for the housing, may launch the ball at least 50 feet, in one embodiment the elastomeric member 40 may also have a smooth texture for its use herein, and may be medium soft, with a 40A durometer. The longer elastomeric member 40 may be configured as shown in the side view of FIG. 6, and may operate in conjunction with a first pulley 51 and a second pulley 52 (FIGS. 8-9), each being rotatably mounted to a first side and a second side of the housing 20, respectively, within the housing cavity. A first end 41 of the elastomeric member 40 may be secured to the right side of housing 20 in proximity to the housing second end 22, and may be anchored thereat with a plate 41P that may be secured to the housing using screws. A portion 43 of the elastomeric member 40 may extend towards the first end 21 of the housing 20, and may wind over the top of pulley 51 (FIG. 7), after which another portion 44 of the elastomeric member may extend back towards the housing second end 22, but may pass through the opening 35 of the ball holder 30. After passing through the opening 35 of the ball holder 30, a portion 45 of the elastomeric member 40 may extend back towards to the first end 21 of the housing 20, and may wind over the top of pulley 52 on the left side of the housing, after which another portion 46 of the elastomeric member may extend back towards the housing second end 22, and the second end 42 of the elastomeric member may similarly be secured thereat using another plate 41P (FIG. 8).

This greater length and arrangement used for elastomeric member 40 may permit the ball holder 30 to be moved from the first position shown in FIG. 3 to a distal position whereby the entire increased length of the elastomeric member 40 may also be used to store strain energy. Also, the portions 44 and 45 of the elastomeric member 40 may be respectively redirected by smaller pulleys 53/54 to be more central within the tracks 20KR/20KL (FIG. 7), and may also pass behind a rotatable rod 55, which may reduce friction and wear, particularly at the end of travel as the ball holder 30 reaches the first position. The smaller pulleys 53/54 and rotatable rod 55 may also operate to assure proper winding of the elastomeric member 40 about the pulleys 51/52, and prevent disengagement therefrom, as the ball holder 30 is biased back to the first position.

Figure 13:
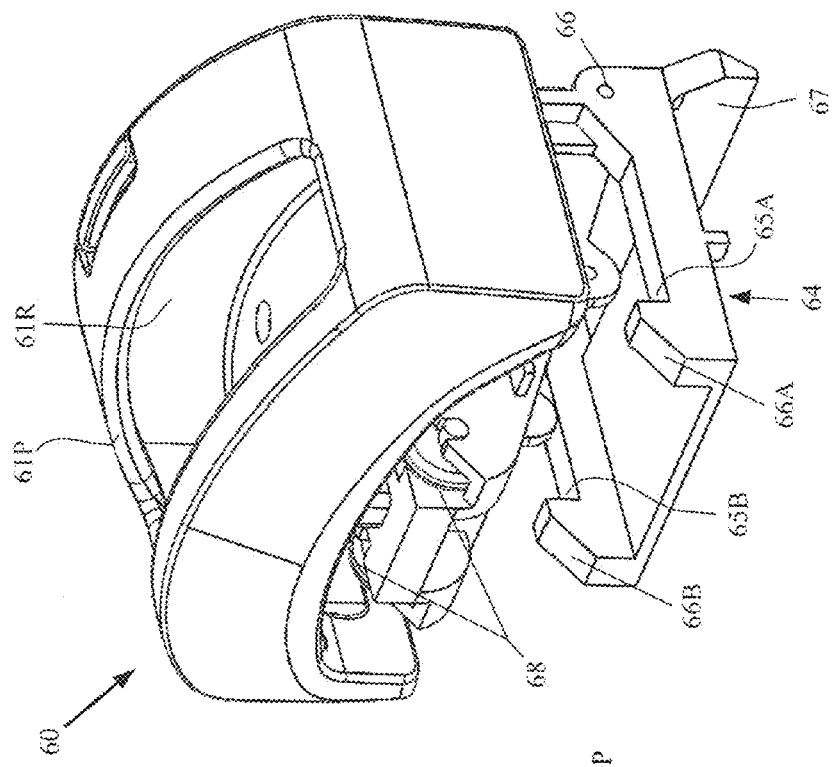
FIG. 13 is a detail perspective view showing the carriage and slide handle joined together.

For the device 10 to be desirably used by a pet owner to launch a ball at a desired time and in a particular direction, the ball holder may be moved into and maintained in a cocked position (i.e., with the elastomeric member deformed to store strain energy), using a cocking member that may be coupled to the ball holder. In one embodiment, as shown in FIG. 4 and FIG. 13, a cocking member 60 may broadly include a first portion 61 disposed outside of the housing 20; a second portion 62 disposed within the housing cavity; and a neck portion 63 that may connect the first and second portions, with the neck portion configured to be slidable within the elongated housing opening 20T. In another embodiment, the cocking member 60 may be integrally formed with the ball holder 30 (e.g., a neck portion may extend from the ball holder and pass through the elongated opening in the housing, and may transition into a graspable portion that is disposed outside of the housing).

Figure 16:
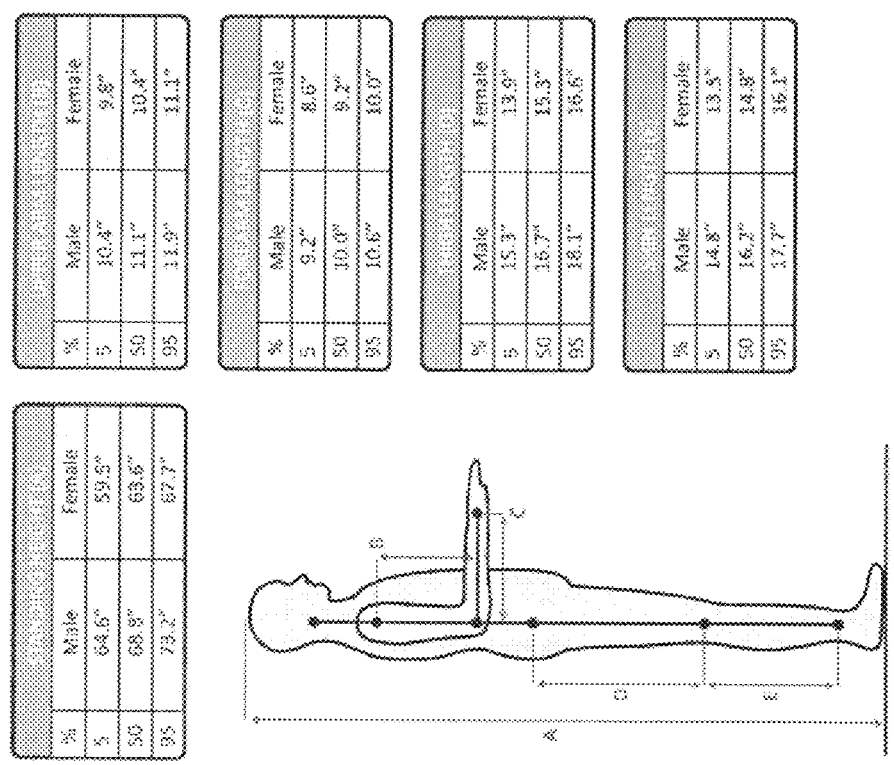
FIG. 16 illustrates the dimensions for certain features of the $5^{th}$ percentile male and female, the $50^{th}$ percentile male and female, and the $95^{th}$ percentile male and female.

The first portion 61, the second portion 62, and the neck portion 63 may all form a single integral part, or the first portion 61 and second portion 62 may be separate parts that may be fastened together, as shown in FIG. 4, in which case the neck portion 63 may extend from either the first or second portions, and through which the fasteners may pass. The top exposed area of the first portion 61 of the cocking member 60 may include an opening 61P defining a finger graspable recess 61R. The lateral extent of the first portion 61 may be such that the finger graspable recess 61R is large enough to receive at least four fingers of a user (i.e., the index, middle, ring, and littler fingers), so that it may thereby be grasped and used to oppose and elastically deform the elastomeric member 40. The compact arrangement for device 10, including the arrangement of the elastomeric member 40, may serve to permit the user to grasp the first portion 61 of the cocking member 60 using recess 61R, and pull the cocking member towards their body into a cocked position, with the second end of the housing butting up against the user's body, for the ball holder to be moved from the first position towards the second position. The ergonomics of this compact arrangement allows a user who may be less agile and who may possess less than average strength (e.g., a young person, and elderly person, etc.) to nonetheless safely and easily move the ball holder into a suitable cocked position, from which the cocking member may be released, to permit the elastomeric member to accelerate the ball holder towards the housing first end to launch the ball therefrom. In one embodiment, the housing may have a length, between its first end 21 and second end 22 of 20 inches, as shown in FIG. 2, and the length of the elongated opening 20T may be less than 19.5 inches, and may preferably be 16.5 inches, for which a length of the elastomeric member would preferably be in the range 700 mm to 800 mm, and may preferably be 750 mm, which may serve to launch a tennis ball at least 50 feet. The device 10 is accurately depicted in the figures using engineering drawings, and as shown in FIG. 2 would thus accommodate use even by a small boy or girl or other small person (see e.g., the "B" and "C" dimensions for the $5^{th}$ percentile woman shown in FIG. 16).

As seen, in FIG. 13, the cocking member 60 may include a plurality of wheels 68 rotatable attached to the first portion 61 and/or to the second portion 62, to rotatably engaged the outside and/or the inside of the housing 20, to permit the cocking member to more easily slide with respect to the housing.

Figure 15:
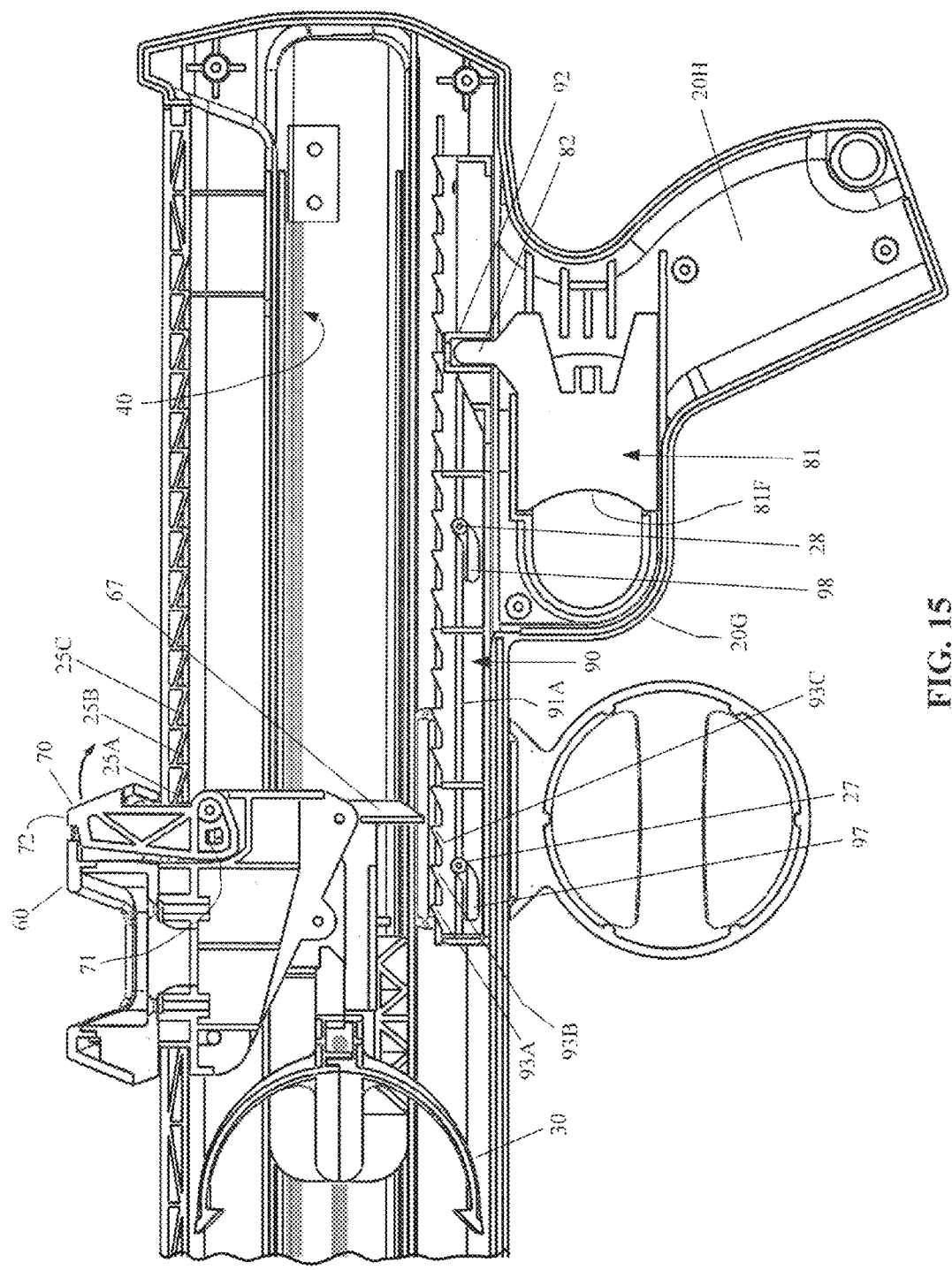
FIG. 15 is an enlarged detail view showing the butt end of the ball launching dog toy illustrated in FIG. 6.

In another embodiment, a latching pawl member 70 may additionally be utilized to releasably secure the cocking member and the ball holder to the housing 20, at a cocked position. As seen in FIG. 15, the latching pawl member 70 may be pivotally mounted to a portion of the cocking member 60, and the housing 20 may be formed to include a plurality of ratchet teeth (e.g., ratchet teeth 25A, 25B, 25C, 25D, etc.) that may protrude from the interior surface 20S into the housing cavity. The ratchet teeth may be successively positioned, and may begin at a location between, the first end 21 and the second end 22 of the housing 20, and may end proximate to the second end 22 of the housing. The pawl 70 may have a tongue portion 71 that may be configured to engage any one or more of the ratchet teeth (e.g., tooth 25C), when properly located, and rotated, as shown in FIG. 15, to releasably secure the cocking member 60 at the corresponding cocked position. The top 72 of the pawl 70 may extend above the cocking member 60, to permit such rotation by the user, which may be conveniently clone using the thumb of the user's band. The cocking member in this embodiment may be easily released, by toggling the pawl 70 to cause it to counter-rotate, to cause disengagement of the tongue portion 71 from the housing tooth (e.g., tooth 25C) with which it had been engaged, which would permit the elastomeric member to freely accelerate the ball holder towards the housing first end to launch the ball therefrom.

It should be noted that this arrangement permits easy adjustment of the ball holder 30 and cocking member 70 from the cocked position, to a different cocked position, to either increase or decrease the amount of strain energy stored by the elastomeric member 40, whereby the pawl tongue 71 may engage a different tooth on the housing 20 (e.g., tooth 25B or 25D). To further increase the stored strain energy, to launch the ball farther, the user may insert his/her four fingers into the recess 61R of cocking member 60 and may pull the cocking member towards the housing second end 22 (e.g., towards their body, depending upon how the device 10 is being held), until the pawl tongue 71 of cocking member 70 is engaged with another tooth, (e.g., tooth 25D) to occupy another cocked position. To decrease the stored strain energy (e.g., causing the pawl tongue 71 to perhaps engage tooth 25B), or to even return the ball holder 30 all the way back to the first position, where the elastomeric member 40 may not possess any stored strain energy, the user may insert his/her four fingers into the recess 61R of cocking member 60, and may apply a force towards the housing second end 22, being just sufficient to counter the bias of the elastomeric member 40, and the user may then toggle the pawl 70, which may be disposed in proximity to the finger graspable recess 61R of the cocking member. This toggling (i.e. rotation) of the pawl 70 may cause its tongue 71 to be positioned, where it may not engage any of the teeth, after which the force applied by the user may be slowly decreased, and the cocking member 60 may thus be allowed to be slowly be biased to slide part way towards the first end 21 and into another cocked position where the pawl may be released to engage a tooth thereat (e.g., tooth 25B), or it may be slid all the way to return the ball holder 30 at its first position.

In yet another embodiment, the cocking member 60 may be releasably coupled to the ball holder 30, the latching pawl member 70 may additionally be biased (e.g., by a torsion spring) into engagement with the ratchet teeth, (e.g., 25A, 25B, 25C, 25D, etc.), and a trigger assembly may be used, to more conveniently permit holding, aiming, and launching of the ball using the device 10, similar to the manner in which a radar gun may be aimed by a law enforcement officer. The ball may thus be launched from device 10 using one hand or both hands.

The releasable coupling of the cocking member 60 to the ball holder 30 may utilize a hook member 64 (FIG. 13) that may have a first end and a second end, the first end of the hook member may include a hook portion (e.g., 65A and/or 65B). The hook member 64 may be pivotally mounted to the second portion 62 of the cocking member 60 using pin 66, at a position that may be distal from its first end (e.g., at its second end). The distal second end of the hook member 64 may have a downward extending flange 67. A spring, e.g., a tension spring or a torsion spring (not shown) mounted to pin 66, may bias the hook portion 65 of the hook member 64 to normally pivot towards the second cocking member portion 62. The ball holder 30 may include a recess or multiple recesses (or protrusions) respectively configured to receive (or be engaged by) the hook portion(s) of the hook member 64. The forward facing portion 66A/66B of the hook portions (65A/65B) of the hook member 64 may be angled, to permit automatic engagement with the recess(es) in the ball holder 30, when the cocking member 60 is moved into proximity with the ball holder at its first position, to be releasably coupled thereto (see FIG. 4 and FIG. 14). The trigger assembly may be configured, when actuated, to trigger disengagement of the hook portions (65A/65B) of the hook member 64 from the ball holder 30, to release the restraint, and permit the elastomeric member 40 to accelerate the ball holder towards the housing first end 21 to launch the ball therefrom.

The trigger assembly, as seen in FIG. 15, may include a trigger member 81 and a release member 90. The trigger member 81 may be slidably mounted within the generally hollow hand grip portion 20H of the housing 20, and may have a forward-most portion 81F that may be curved and may be exposed, and may be facing, but offset from, the trigger guard 20G. The trigger member 81 may have an upwardly disposed protrusion 82 that may be received within a recess 92 of the release member 90. The release-member 90 may have an elongated arm 91A that may be disposed in the axial direction within the cavity of housing 20, and which may have a plurality of serrations or teeth (e.g., 93A, 93B, 93C, etc.) formed on an upper edge thereof. The housing 20 may have a first pin 27 and a second pin 28 protruding inwardly into the housing cavity, and the elongated arm 91A may having first and second shaped openings 97 and 98, which may respectively track upon the pins 27/28 to impart particular motion to the release member 90, in the manner of a cam and follower. The shaped openings 97 and 98 may first angle downwardly when moving in the axial direction toward the housing first end 21, and may then generally extend to be parallel to the axial direction. Therefore, as seen in FIG. 15, as the trigger member 81 is actuated (i.e., is pulled toward the housing second end 22), the protrusion 82 engaged within the recess 92, being slidably engaged therein in a direction perpendicular to the axial direction 20X, may drive the release member 90 to correspondingly move.

With the angled portion of the shaped openings 97 and 98 first being engaged by the pins 27/28, the rearward movement of the trigger 81 would cause relative movement of the release member, whereby it would be driven to similarly move rearward toward the second end 22 and also upward towards the cocking member 60, so that the vertical portion of one of the serrated teeth (e.g., tooth 93B) on its upper edge may be adjacent to the flange 67 of the cocking member. During this upward and rearward travel of the release member 90, the protrusion 82 of the trigger member 81 may become slightly withdrawn, from the recess 92 of the release member, as it is elevated. As the axially extending portion of the shaped openings 97 and 98 next engage the pins 27/28, the release member 90 will be correspondingly driven to move substantially rearward, and thus the tooth (e.g., tooth 93B) that was positioned adjacent to the flange 67 of the cocking member 60 will contact the distal end of the flange, and cause it to pivot against the bias provided thereto, and cause it to uncouple from the ball holder 30. The unrestrained ball holder 30 will then be biased and accelerated by the elastomeric member 40 towards its first position, and as it approaches the first position, it will be quickly decelerated by the springs 35, which prevent shock loading of the housing 20, and simultaneously permit launching of the ball from the ball holder 30.

In another embodiment shown in FIG. 8, a transverse member 94, within which the recess 92 may be formed (see FIG. 3), and may connect the elongated arm 91A that may be positioned on the left side of the housing cavity, with an elongated arm 91B that may be positioned on the right side of the housing cavity. Each of the elongated arms 91A and 91B may be formed with, the serrations, to redundantly be able to actuate the flange 67 of the cocking member 60 and cause it to pivot and uncouple from the ball holder 30.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A compact ball-launching dog toy comprising:
an elongated housing having a first end and a second end, said elongated housing comprising: an opening at said first end defining an interior surface of a linearly elongated cavity; and an elongated opening interconnected with said linearly elongated cavity;
a ball holder disposed in said housing cavity and configured to slide in said linearly elongated housing cavity from a first position proximate to said opening at said first end of said elongated housing, to a second position between said first position and said second end of said elongated housing;
an elastomeric member comprising length, said elastomeric member selectively arranged within said elongated housing to bias said ball holder from said second position towards said first position, wherein said elastomeric member selectively arranged within said elongated housing comprises a portion of said elastomeric member being linearly disposed therein when said ball holder is moved away from said first position;
a cocking member coupled to said ball holder, said cocking member comprising: a first portion disposed outside of said elongated housing; a second portion disposed within said housing cavity; and a neck portion between said first and second portions, said neck portion configured to be slidable within said elongated opening;
a first pulley and a second pulley rotatably mounted to a first side and a second side of said housing cavity, respectively, in proximity to said housing first end; wherein said elastomeric member being selectively arranged within said housing further comprises: a first end and a second end said elastomeric member each respectively secured to said first side and said second side of said housing cavity, between said first and second ends of said housing, with said elastomeric member wound over said first pulley, around a portion of said ball holder, and over said second pulley, to provide said bias and
wherein said first portion of said cocking member is configured t be actuated by a user to oppose said bias and pull said cocking member toward a body of the user into a cocked position, with said second end of said elongated housing positioned against the user's body, for said ball holder to be moved from said first position at least part-way towards said second position.

2. The compact ball-launching dog to according to claim 1, further comprising a latch configured to releasably secure said cocking member and said ball holder at said cocked position, to releasably hold said elastomeric member in an extended position, to oppose said bias thereof.

3. The compact ball-launching dog toy according to claim 2, wherein said cocking member is releasably coupled to said ball holder, said compact ball-launching dog toy further comprising a trigger assembly movably mounted to said elongated housing, and configured, when actuated, to trigger said latch, to release said ball holder and permit said elastomeric member to accelerate said ball holder towards said first end of said elongated housing to launch the ball therefrom.

4. The compact ball-launching dog toy according to claim 3, wherein said latch comprises:
a plurality of ratchet teeth protruding from said interior surface of said housing cavity, said ratchet teeth successively positioned between said first end aid said second end of said elongated housing;
a pawl pivotally mounted tip said cocking member, with a first portion of said pawl configured to engage one of said plurality of ratchet teeth at said cocked position;
a hook member having a first end and a second end, said first end of said hook member comprising a hook portion, said hook member pivotally mounted, distally from said first end, to said second portion of said cocking member;
a spring configured to bias said hook portion of said hook member to pivot towards said second cocking member portion;
a recess in said ball holder; said hook portion of said hook member configured to automatically engage said recess of said ball holder, when said cocking member is moved into proximity with said ball holder at said first position, to be releasably coupled thereto;
means for biasing said pawl into engagement with said one of said plurality of ratchet teeth, to releasably retain said coupled cocking member and ball holder at said cocked position; and
wherein said trigger assembly is configured, when actuated, to disengage said hook portion of said hook member from said recess of said ball holder, for said elastomeric member to accelerate said ball holder toward said first end of said elongated housing.

5. The compact ball-launching dog toy according to claim 4, wherein said pivotally mounted pawl further comprises a second portion disposed outside of said elongated housing, being actuable to pivot said pawl to become disengaged from said one of said plurality of ratchet teeth, for said cocking member to freely move with respect to said elongated opening.

6. The compact ball-launching dog toy according to claim 5,
wherein said first portion of said cocking member comprises a finger graspable recess on a top thereof, being configured to receive at least four fingers of the user to extend said elastomeric member; and
wherein said second portion of said pawl is disposed in proximity to said finger graspable recess of said first portion of said cocking member.

7. The compact ball-launching dog toy according to claim 6 wherein when said cocking member is in said cocked position with said pawl first portion engaged with said one of said plurality of ratchet teeth, said second portion of said pivotally mounted pawl being actuable to adjust said cocking member from said cocked position to another cocked position, for said pawl first portion to engage a second of said plurality of ratchet teeth.

8. The compact ball-launching dog toy according to claim 6 wherein when said cocking member is in said cocked position with said pawl first portion engaged with said one of said plurality of ratchet teeth, said second portion of said pivotally mounted pawl being actuable to disengage said pawl first portion from said one of said plurality of ratchet teeth, to move said ball holder back to said first position, without said trigger being actuated to trigger said latch, to release said elastomeric member.

9. The compact ball-launching dog toy according to claim 6, wherein said elongated housing further comprises a handle portion extending away from a bottom of said elongated housing, proximate to said second end.

10. The compact ball-launching dog toy according to claim 9, wherein said trigger assembly comprises:
a trigger member slidably mounted with respect to said handle portion of said elongated housing; and a release member, said release member comprising a transverse member and a pair of elongated arms configured to extend from said transverse member, and configured to extend in said axial direction at a bottom of said housing cavity; a top of each of said, pair of arms comprising a plurality of teeth, and each of said pair of arms comprising a pair of shaped openings;

wherein said elongated housing comprises a pair of pins protruding inwardly into said cavity from a first side and a second side of said cavity; and wherein said pair of shaped opening on each of said pair of arms is configured to respectively track on said pins on said first and second sides of said elongated housing to cause said arms to first elevate into engagement with said hook member, and to subsequently translated axially to drive said hook member to cause said disengagement of said hook portion from said recess of said ball holder, for said elastomer e member to accelerate said ball holder toward said first end of said elongated housing.

11. The compact ball-launching dog toy according to claim 6, further comprising a first deceleration spring and a second deceleration spring mounted to said first side and said second side of said housing cavity, respectively, in proximity to said first and second pulleys, to prevent shock loading of said elongated housing by said ball holder.

12. The compact hall-launching dog toy according to claim 6, wherein said ball holder comprises a spherical sector configured to receive a portion of the ball therein, a first inward protruding lip, and a second inward protruding lip; said first and second inward protruding lips configured to releasably engage the ball in a slight friction fit.

13. The compact ball-launching dog toy according to claim 6, wherein said elongated opening of said elongated housing comprises a length of less than 19.6 inches.

14. The compact ball-launching dog toy according to claim 6 therein said elongated opening of said elongated housing comprises a length of 16 inches; and wherein said elastomeric member comprises a spring constant, configured to launch a tennis ball from the ball holder at least fifty feet, when said cocked position comprises a position being with said pawl first portion engaged with said one of said plurality of ratchet teeth for said cocking member to be at an end of said elongated opening in said elongated housing being distal from said first end of said elongated housing.

15. A ball-launching toy comprising:
a housing having a first end and a second end, said housing comprising: an opening at said first end defining an interior surface of a linearly elongated cavity;
a ball holder disposed in said housing cavity and being configured to slide in said linearly elongated cavity in a direction away from a first position, being proximate to said opening at said housing first end, to a second position proximate to said second end of said housing;
an elastomeric member comprising a length, said elastomeric member selectively arranged within said housing to bias said ball holder from said second position towards said first position;
a cocking member comprising: a first portion configured to be slidable within said elongated housing opening;
a first pulley and a second pulley rotatably mounted to a first side and a second side of said housing within said cavity, respectively, in proximity to said housing first end; wherein said elastomeric member being selectively arranged within said housing comprises: a first end and a second end said elastomeric member each respectively secured to said first side and said second side of said housing cavity, distally from said first end of said housing, with said elastomeric member wound over said first pulley, around a portion of said ball holder, and over said second pulley, to provide said bias; and
wherein said cocking member is configured to be actuated to oppose said bias and to move said cocking member toward said second end of said housing into a cocked position, for said ball holder to be moved from said first position to said second position.

16. The hall-launching toy according to claim 15, further comprising a latch configure to releasably secure said cocking member at said cocked position, and oppose said bias to releasably hold said elastomeric member in an extended position.

17. The ball-launching toy according to claim 16, wherein said cocking member is releasably coupled to said ball holder, said ball-launching toy further comprising a trigger assembly movably mounted to said housing, and configured, when actuated, to trigger said latch, to release said ball holder and permit said elastomer to member to accelerate said ball holder towards said housing first end to launch the ball therefrom.

* * * * *